US 9,314,728 B2

(12) United States Patent
Halstenberg

(10) Patent No.: US 9,314,728 B2
(45) Date of Patent: Apr. 19, 2016

(54) FLAME RETARDANT FOR FILTER SYSTEMS AND METHOD FOR IMPROVING FLAME RESISTANCE IN FILTER SYSTEMS

(75) Inventor: Jörg Halstenberg, Bad Oeynhausen (DE)

(73) Assignee: Kompoferm GmbH (DE)

( * ) Notice: Subject to any disclaimer, the term of this patent is extended or adjusted under 35 U.S.C. 154(b) by 0 days.

(21) Appl. No.: 14/342,851

(22) PCT Filed: Sep. 7, 2011

(86) PCT No.: PCT/EP2011/004501
§ 371 (c)(1),
(2), (4) Date: Mar. 5, 2014

(87) PCT Pub. No.: WO2013/034164
PCT Pub. Date: Mar. 14, 2013

(65) Prior Publication Data
US 2014/0238241 A1    Aug. 28, 2014

(51) Int. Cl.
*B01D 46/50*    (2006.01)
*B01D 39/06*    (2006.01)

(52) U.S. Cl.
CPC ............... *B01D 46/50* (2013.01); *B01D 39/06* (2013.01); *B01D 2239/0457* (2013.01)

(58) Field of Classification Search
CPC . B01D 39/06; B01D 46/50; B01D 2239/0457
USPC .......................................................... 95/273
See application file for complete search history.

(56) References Cited

U.S. PATENT DOCUMENTS

| 2,978,064 | A | * | 4/1961 | Deaver ............................ 96/151 |
| 4,142,969 | A | * | 3/1979 | Funk et al. .................... 210/680 |
| 4,260,399 | A | | 4/1981 | Kawasaki |
| 4,295,868 | A | * | 10/1981 | Holter et al. .................... 55/302 |
| 5,632,889 | A | * | 5/1997 | Tharp ............................ 210/165 |
| 6,010,558 | A | * | 1/2000 | Ackland ......................... 95/141 |
| 6,464,770 | B1 | * | 10/2002 | Palm et al. .................... 106/409 |
| 6,630,016 | B2 | * | 10/2003 | Koslow .......................... 95/285 |

(Continued)

FOREIGN PATENT DOCUMENTS

| DE | 19802622 | 7/1999 |
| DE | 19817971 | 9/1999 |

(Continued)

OTHER PUBLICATIONS

Shafrin, Elain G. Zisman, Wiliam A.; "Constitutive Relations in the Wetting of Low Energy Surfaces and the Theory of the Retraction Method of Preparing Monolayers "; May 1960; U.S. Naval Research Laboratory; p. 519 http://pubs.acs.org/doi/pdf/10.1021/j100834a002.*

(Continued)

*Primary Examiner* — Amber R Orlando
*Assistant Examiner* — Britanny Precht

(57) ABSTRACT

A method for improving flame resistance in filter systems in which an air flow charged with flammable aerosols is fed to a filter. The filter prevents a least a substantial portion of the flammable aerosol from reaching the air flow exiting the filter. A granular flame retardant material is fed to the air flow containing the flammable aerosols prior to the air flow containing the flammable aerosols being fed to the filter. The flame retardant has porous mineral granuales as an essential component.

9 Claims, 5 Drawing Sheets

(56) References Cited

U.S. PATENT DOCUMENTS

Figure 1:
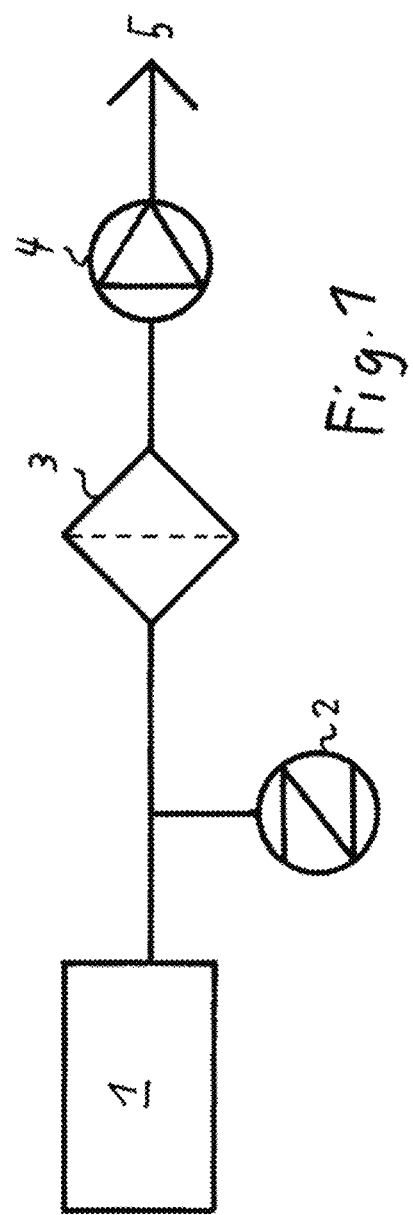
Figure 2:
Figure 3:
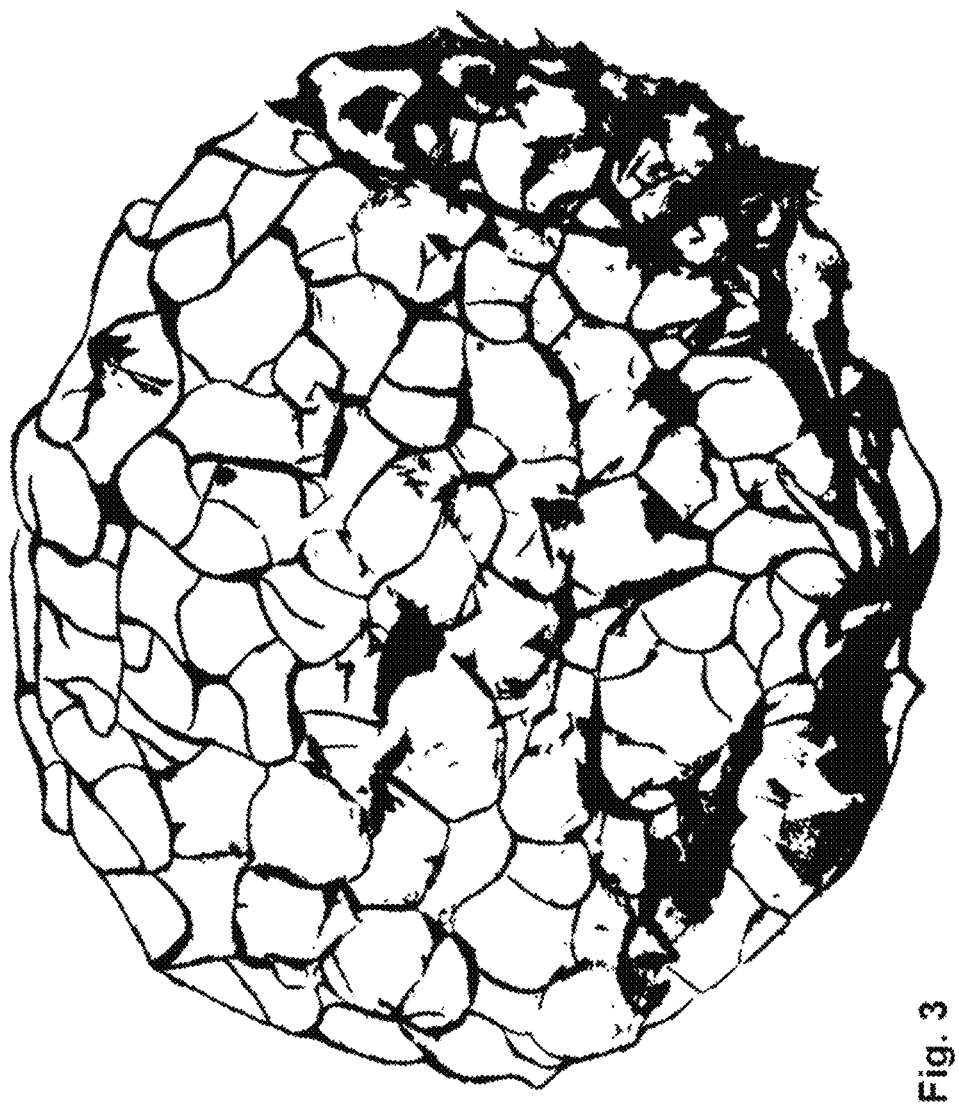
Figure 4:
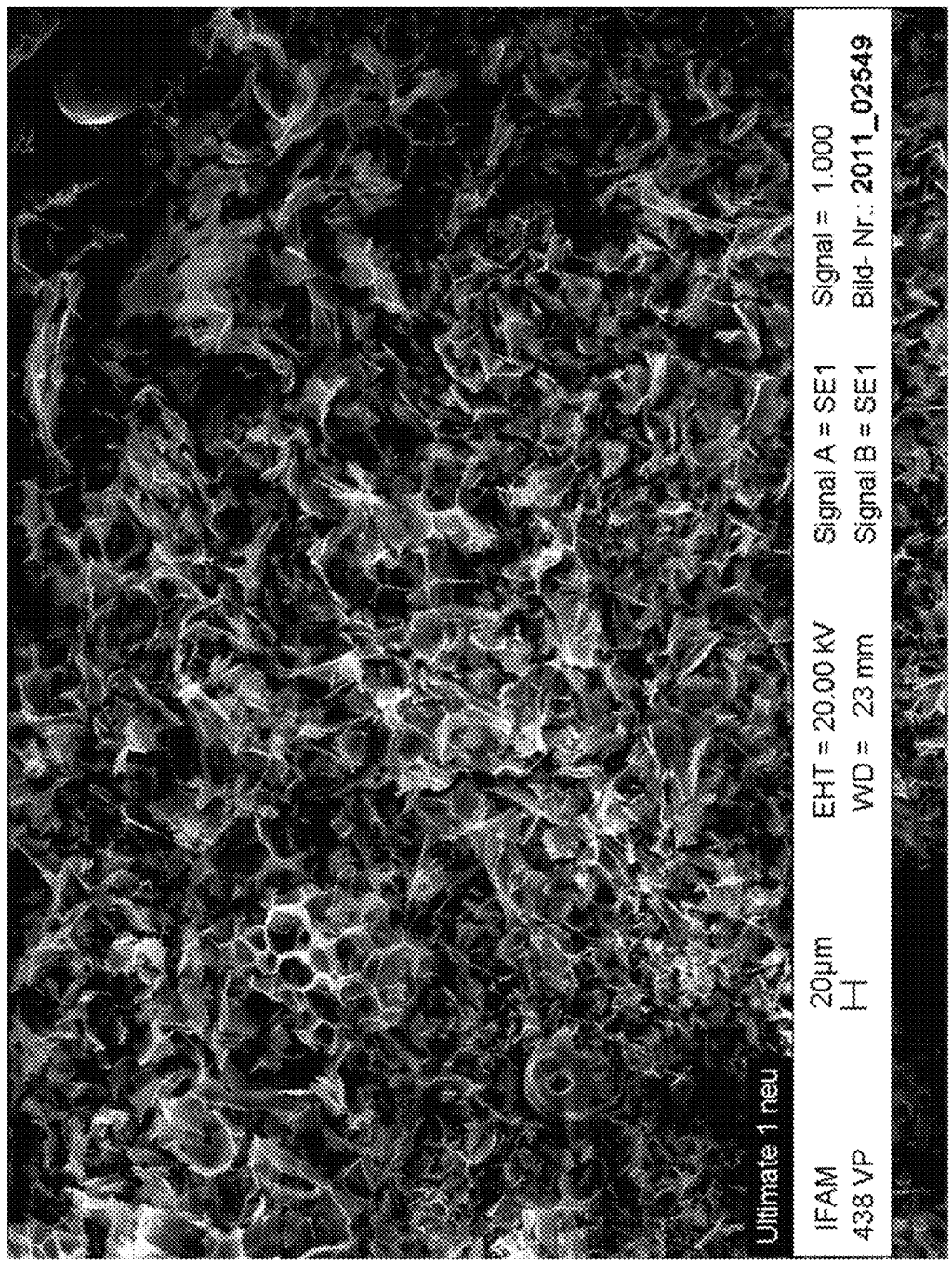
Figure 5:
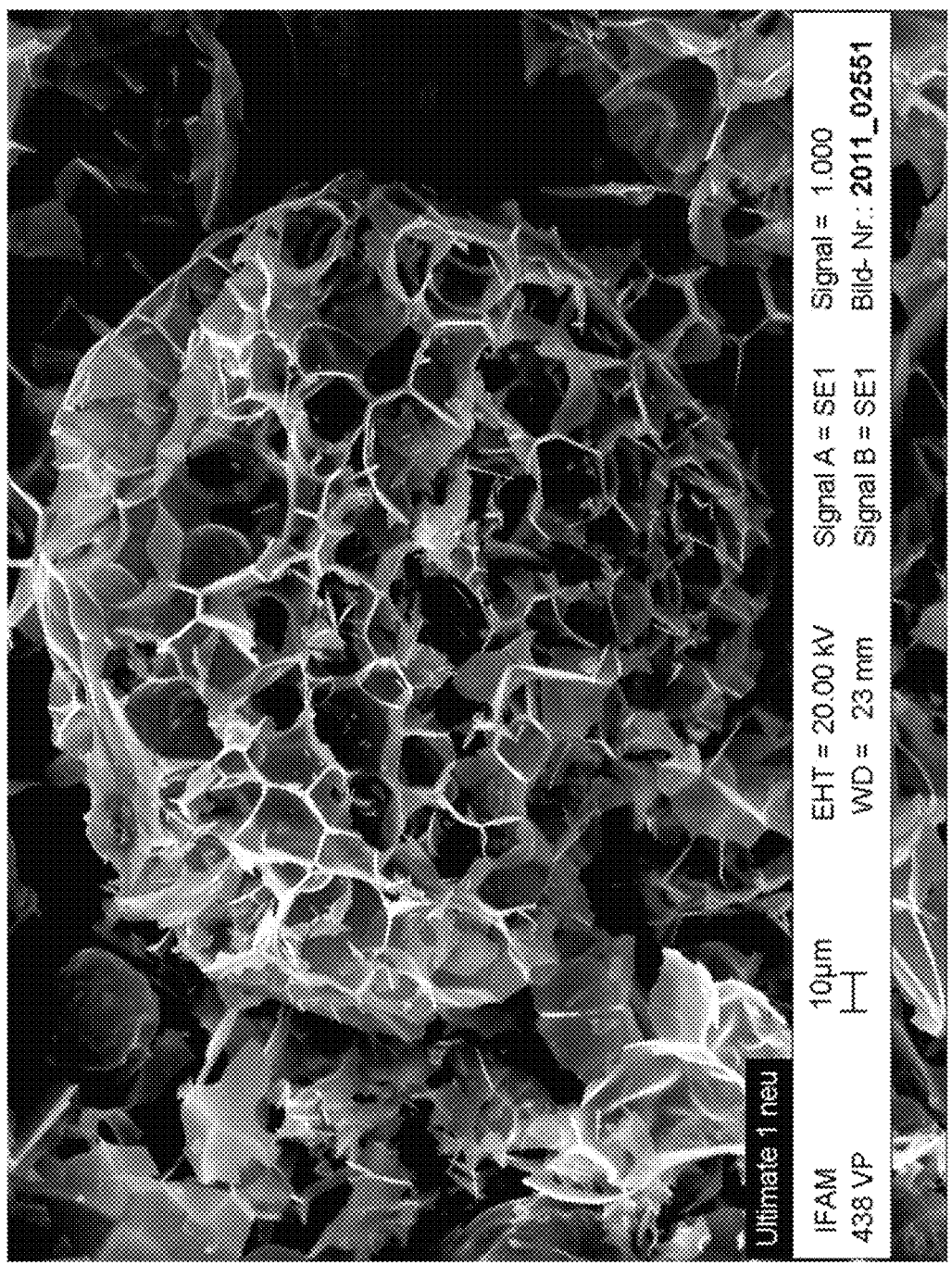

| | | | |
|---|---|---|---|
| 8,242,050 B2* | 8/2012 | Lu et al. | 502/407 |
| 2004/0099184 A1* | 5/2004 | Palm et al. | 106/409 |
| 2006/0048646 A1* | 3/2006 | Olson et al. | 95/134 |
| 2006/0260286 A1* | 11/2006 | Schlebes et al. | 55/523 |
| 2008/0023383 A1* | 1/2008 | Sansalone | 210/170.03 |
| 2008/0029039 A1* | 2/2008 | Jenkins | 119/173 |
| 2011/0189485 A1* | 8/2011 | Bordado et al. | 428/407 |
| 2011/0195166 A1* | 8/2011 | Li et al. | 426/417 |
| 2012/0046165 A1* | 2/2012 | Lu et al. | 502/406 |
| 2012/0292250 A1* | 11/2012 | Lu et al. | 210/502.1 |

FOREIGN PATENT DOCUMENTS

| | | |
|---|---|---|
| GB | 2016432 | 9/1979 |
| JP | S050112230 | 9/1975 |
| JP | S5358865 | 5/1978 |
| JP | S57187016 | 11/1982 |
| JP | 60193519 | 10/1985 |
| JP | H06238118 | 8/1994 |
| JP | 07332060 | 12/1995 |
| JP | H08299739 | 11/1996 |
| JP | 2001017816 | 1/2001 |
| JP | 2002001033 | 1/2002 |
| JP | 2012096184 | 5/2012 |

OTHER PUBLICATIONS

Chen, Wu; "What are Filter Aids?"; Oct. 24, 2014; American Filtration and Separations Society; All Pages https://web.archive.org/web/20141024183514/http://www.afssociety.org/filtration-media/61-what-are-filter-aids.*

General Filtration; "Filter Aid Filtration"; Jan. 14, 2014; All Pages https://web.archive.org/web/20140114224310/http://www.generalfiltration.com/assets/uploads/Filter_Aid_Filtration.pdf.*

International Search Report in PCT Application PCT/EP2011/004501, EPO, Jun. 25, 2013.

Japanese Patent Office, Translated Examiner's Objection of Japanese Application 2014-528863, May 26, 2015.

* cited by examiner

FLAME RETARDANT FOR FILTER SYSTEMS AND METHOD FOR IMPROVING FLAME RESISTANCE IN FILTER SYSTEMS

TECHNICAL FIELD

The invention relates to a flame retardant for filter systems and to a method for improving flame resistance in filter systems.

PRIOR ART

In many fields of technology and industry, waste air flows that are charged with aerosols are produced. The aerosols consist of finely divided solid or liquid suspended particles that are entrained in the waste air flows and as a rule have to be separated from said waste air flows.

Commonly filter systems which retain the aerosol particles are used for separating the aerosol particles from the air flow. Since the aerosols are often flammable and since they tend to ignite easily as a result of their large specific surface area, fires or explosions or deflagrations occur commonly in these filter systems. These types of fires are often associated with great damage to the filter systems, because they are noticed only very late as a rule and, depending on the type of aerosols, they are also often very difficult to extinguish, particularly if, for example, small metal particles are present as aerosol particles and accordingly high combustion temperatures are reached.

The invention is therefore based on the problem of indicating a flame retardant for filter systems and a method for improving flame resistance, which lower the risk of fires and/or explosions in filter systems.

According to the invention, a method is provided in which an air flow charged with a flammable aerosol is fed to the filter, wherein the filter retains the aerosol from the air flow at least in a substantial proportion, wherein a granular flame retardant is fed to the air flow fed to the filter. In the process, the granular flame retardant is distributed in the air flow and the granules interact with the aerosol, as a result of which the potentially reactive surface area of the aerosol is reduced and therefore the risk of ignition is lowered. The flame retardant is then separated from the aerosol in the filter and it can then be fed together with the separated aerosol to disposal or to recycling.

The flame retardant according to the invention here preferably has porous mineral granules, advantageously also cookie and/or chip shaped fragments of the granules, as essential component. Due to the porosity, the granules have a large surface area which can interact with the aerosol and is thus capable of binding large quantities of aerosol particles. Here, the mineral material itself offers the advantage of not being ignitable, so that the surface area of the flame retardant itself does not add a new source of ignition. As a result, due to the flame retardant particles in the air flow, not only is the risk of fire in the filter itself reduced, but the risk of ignition of the aerosol in the air flow on its way to the filter is also already reduced.

The granules here preferably have a pore volume of more than 80%, particularly advantageously a pore volume of more than 90%. Here, the pore volume is defined as the quotient of the volume of the pores of a granule particle to its total volume. Such highly porous materials, on the one hand, have the advantage of making available a large surface area, and, on the other hand, due to their low density, they are entrained without problem by the air flow, so that an undesired separation from the air flow can be prevented.

Advantageously, the granules have silicon dioxide, in particular at concentrations of 60 to 80 wt %, as an essential component. Said silicon dioxide has the advantage that, in addition to its inertness, it is not hazardous to health and it is available in practically unlimited quantity in nature as an inexpensive raw material. The granules are preferably expanded mineral perlite. From natural mineral perlite, which is available as a naturally occurring inexpensive raw material, expanded mineral perlite can be produced in a simple way by an expansion process. For this purpose, the mineral perlite only needs to be heated sufficiently so that it becomes viscous, because the naturally occurring mineral perlite contains water inclusions which evaporate during this process and thus yield a highly porous granular material.

It is preferable for the flame retardant to be comminuted before it is fed into the air flow or in the air flow. The smaller the granules of the flame retardant are, the easier they can be entrained by the air flow and the more readily accessible the surfaces located in the pores are. In general, the useful surface area of the flame retardant is increased. The comminution can here occur in the form of a separate process step or as the consequence of a series of collisions of the granules with one another or with obstacles, for example, pipe walls, in the air flow.

The filter can be a cake filter, a cross flow filter or a depth filter. Here, in the case of a cake filter, the retention of the particles occurs in a filter cake that builds up from the filter medium. In the case of a depth filter, the particles are separated on the filter medium itself, after they have penetrated into the latter, while in the case of a cross flow filter, the build up of a cake and the penetration of the particles into the filter medium are prevented by the small angle that the flow forms relative to the filter medium, thus making it possible to achieve a low pressure loss over the filter medium.

The filter medium of the filter can be a felt, an oriented-fiber nonwoven, a spunbond, a random laid nonwoven fabric, and a mono- or polyfilament fabric. However, it is also possible to use a porous solid as filter medium, for example, a packed bed or a sintered metal. Similarly, membranes or filter media wound from yarns can be used conceivably. An advantage of the method according to the invention and the flame retardant according to the invention is that the additional flame retardant normally does not entail an increase in the requirements placed on the filter medium. Rather, in many cases, particularly in the case of filters that form cakes, it can be expected that the granules of the flame retardant have a positive effect on the ability of flow to pass through the filter cake or, in the case of filtration methods that do not form cakes, that the conglutination or the clogging of the filter material is prevented or at least made more difficult. The latter advantage is particularly important if the aerosol consists of hydrocarbons, particularly oils or fats.

The flame retardant can be used, for example, in the following industry branches: wood and wood material processing, paper processing and printing, plastic processing; textile, leather, rubber and metal processing, the pneumatic conveyance technology, car and accessories technology, metal processing, laser technology, chemistry, pharmacy, disposal and recycling. In these industry branches, waste air flows charged with solid or liquid aerosols for which the flame retardant can be used effectively are commonly produced.

In general, one can consider applying the flame retardant to any waste air flows charged with aerosol. However, particularly advantageous fields of application involve waste air flows in the fields of food technology, food processing technology, chemical, thermal and mechanical processing technology as well as manufacturing technology. In these technical fields in particular, waste air flows charged with aerosols are produced that commonly contain oils, fats or other hydrocarbons and as a result are readily flammable, but they can be bound satisfactorily with the flame retardant according to the invention. It is also advantageous here if the flame retardant is wettable by the aerosol; preferably the aerosol forms a contact angle <90° with the flame retardant. As a result, the aerosol adheres particularly well to the flame retardant and it can penetrate rapidly into the pores of the granules and/or adhere better to fragments of the granules, as a result of which the surface area of the aerosol particles in contact with the air flow is reduced to a fraction of the original surface area.

Examples of methods from the field of manufacturing technology, in which waste air flows charged with aerosol occur and for which the method according to the invention for improving flame resistance is particularly well suited, are, for example, primary forming methods, that is to say methods such as casting or sintering, in which a work piece is produced from a shapeless substance. Here, auxiliary substances that evaporate during the manufacture in particular are present as aerosol. However, secondary forming methods, such as forging, rolling, extrusion molding, deep drawing, compressive forming methods, according to DIN 8583, tensile-compressive forming methods according to DIN 8584, tensile forming methods according to DIN 8585, bending forming methods according to DIN 8586 and shearing forming methods according to DIN 8587 can represent sources of waste air flows charged with aerosol, for example, due to the use of separating agents, in which the invention can be used advantageously.

In addition there are separation methods, in particular machining with geometrically defined or undefined cutting edge, such as, for example, drilling, milling, turning, sawing, grinding, honing or lapping, as well as joining methods, such as particularly welding or soldering, all the coating methods as well as the methods for modifying the substance properties, such as hardening, annealing, tempering, aging, or quenching and tempering, that constitute sources of waste air flows, for which an improved flame resistance according to the invention is particularly advantageous, since here evaporated auxiliary agents that generally contain hydrocarbons are frequently present both in the manufacturing process and also in the form of metal particles in the waste air flows, resulting in a particularly great need for an effective flame resistance.

BRIEF DESCRIPTION OF THE FIGURES IN THE DRAWINGS

These and other features and advantages of the present invention will be better understood by reading the following detailed description, taken together with the drawings wherein;

FIG. 1 is a diagrammatic process flow chart of an example of a method according to the invention;

FIG. 2 is a diagrammatic representation of the surface of a flame retardant according to the invention;

FIG. 3 is a diagrammatic representation of an individual granule of a flame retardant according to the invention with its open-pore surface structure;

FIG. 4 is a scanning electron microscope view of the surface structure of an example of a flame retardant according to the invention; and FIG. 5 is a scanning electron microscope view of an individual granule of an example of a flame retardant according to the invention with its open-pore surface structure.

DESCRIPTION OF THE PREFERRED EMBODIMENT

In the method of the example, the waste air flow charged with the aerosol is produced in a process and/or manufacturing technological device 1 as an example. By means of a distributor 2 for solid substances, the flame retardant according to the invention used as an example is added to the waste air flow and separated together with the aerosol in the filter 3. In the example of the method, the waste air flow is conveyed through the fan 4, which is advantageously arranged behind the filter in the depicted example. The waste air flow that has been cleaned in this manner can be released, for example, via a clean gas outlet 5. The distributor 2 can be any desired injector; for example, the flame retardant can be injected into the waste air flow.

The flame retardant used as an example is an expanded mineral perlite. By means of the expansion process, the mineral perlite reaches a packed bed density of 70±20 kg/$m^3$ at 20° C. In the process, inside the granule of mineral perlite, a high porosity is produced with an open pore structure, wherein the pore openings on the surface have diameters in the order of magnitude range from 5 to 40 μm. Since the pores do not have a circular shape, the term diameter should be understood here in the sense of a diameter equivalent, i.e., it should be understood as the diameter that a pore of equal size would have in the case of a circular shape. As size, the cross section of the pore opening toward the surface of a granule particle is used here, since the size of such an opening determines the possible penetration of an aerosol into the porous granule particle.

In the depicted advantageous case, the cell walls between the pores, owing to the achieved high porosity of the granules, have a wall thickness in the order of magnitude range of approximately one μm. These very thin cell walls made of a hard and brittle material break easily—as can be seen well in FIG. 4 and particularly in FIG. 5—so that numerous broken cell wall fragments are present that still adhere to the granules and that adhere particularly well to the surfaces of, for example, fine oil droplets, and thus coat said droplets with an ignition inhibiting layer.

Modifications and substitutions by one of ordinary skill in the art are considered to be within the scope of the present invention, which is not to be limited except by the allowed claims and their legal equivalents.

The invention claimed is:

1. A method for improving the flame resistance in filter systems in which an air flow charged with flammable aerosols previously generated by a process is fed to a filter, wherein the filter retains the flammable aerosols from the air flow at least in a substantial proportion, said method comprising:

receiving, from a process, an air flow charged with flammable aerosols previously generated by said process;

introducing and distributing a granular flame retardant material into the air flow charged with flammable aerosols after said flammable aerosols are generated by said process and received into said air flow and prior to said air flow charged with flammable aerosols being fed to the filter, said granular flame retardant material consisting of non-flammable porous mineral granules including large surface area for interacting and binding with a large quantity of said flammable aerosols in said air flow, wherein said non-flammable porous mineral. granules introduced and distributed into said airflow interacts and binds with said flammable aerosols while still in said air flow, for reducing the reactive surface area of said flammable aerosols; and providing a filter, disposed in said air flow charged with flammable aerosols and said granular flame retardant material, said filter configured for retaining the combination of said granular flame retardant material and interacted flammable aerosols introduced and distributed into said air flow.

2. The method according to claim 1, characterized in that the non-flammable porous mineral granules are expanded mineral perlite granules.

3. The method according to claim 1, characterized in that the granular flame retardant material is comminuted before being introduced into the air flow charged with flammable aerosols.

4. The method according to claim 1, characterized in that the flammable aerosols comprise hydrocarbons, particularly oils or fats.

5. The method according to claim 1, characterized in that the air flow charged with flammable aerosols is a waste air flow from said process in a field selected from the group of fields consisting of food technology, food, chemical, thermal, mechanical processing technology and manufacturing technology.

6. The method according to claim 1, characterized in that the filter is selected from the group of filters consisting of a cake filter, a cross flow filter and a depth filter.

7. The method according to claim 1, characterized in that the air flow, as it passes through the filter, passes at least partially through a filter medium, wherein the filter medium is selected from the group of filter mediums consisting of a screen, a felt, an oriented-fiber nonwoven, a spunbond, a random laid nonwoven fabric, a packed bed, a porous solid, a sintered metal porous solid, a filter medium wound from yarns, a membrane, a monofilament fabric and a polyfilament fabric.

8. The method of claim 1, characterized in that the granular flame retardant material is wettable by the flammable aerosol; and wherein the flammable aerosols forms a contact angle of less than 90° with the granular flame retardant material.

9. The method of claim 1, characterized in that the air flow occurs in a work area selected from the group of work areas consisting of a primary forming work area, a secondary forming work area, a separating work area, a joining work area, a coating work area and a work area that modifies substance properties.

* * * * *